(12) United States Patent
Tani

(10) Patent No.: US 7,836,289 B2
(45) Date of Patent: Nov. 16, 2010

(54) BRANCH PREDICTOR FOR SETTING PREDICATE FLAG TO SKIP PREDICATED BRANCH INSTRUCTION EXECUTION IN LAST ITERATION OF LOOP PROCESSING

(75) Inventor: Takenobu Tani, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/194,783

(22) Filed: Aug. 20, 2008

(65) Prior Publication Data
US 2009/0055635 A1 Feb. 26, 2009

(30) Foreign Application Priority Data
Aug. 24, 2007 (JP) ............... 2007-218827

(51) Int. Cl.
*G06F 9/38* (2006.01)
(52) U.S. Cl. ............... 712/241; 712/234; 712/239
(58) Field of Classification Search ............... None
See application file for complete search history.

(56) References Cited

U.S. PATENT DOCUMENTS

| | | | |
|---|---|---|---|
| 5,850,551 A | 12/1998 | Takayama et al. | |
| 5,909,573 A | 6/1999 | Sheaffer | |
| 6,263,428 B1 | 7/2001 | Nonomura et al. | |
| 6,477,562 B2 | 11/2002 | Nemirovsky et al. | |
| 6,571,385 B1 * | 5/2003 | Muthukumar et al. | 717/150 |
| 7,010,676 B2 | 3/2006 | Busaba et al. | |
| 7,269,713 B2 | 9/2007 | Anderson et al. | |
| 7,337,303 B2 | 2/2008 | Anderson et al. | |
| 7,360,062 B2 | 4/2008 | Kalla et al. | |
| 2002/0062435 A1 | 5/2002 | Nemirovsky et al. | |
| 2004/0210742 A1 | 10/2004 | Levitan et al. | |
| 2004/0215946 A1 | 10/2004 | Kalla et al. | |
| 2005/0021931 A1 | 1/2005 | Anderson et al. | |
| 2007/0016757 A1 | 1/2007 | Anderson et al. | |
| 2008/0114975 A1 * | 5/2008 | Yen | 712/233 |
| 2008/0162904 A1 | 7/2008 | Kalla et al. | |

FOREIGN PATENT DOCUMENTS

| | | |
|---|---|---|
| JP | 62-234293 A | 10/1987 |
| JP | 2987311 B2 | 10/1999 |
| JP | 3570855 B2 | 7/2004 |
| JP | 3716414 B2 | 9/2005 |
| JP | 3805305 | 5/2006 |
| JP | 3877527 | 11/2006 |
| JP | 4086808 | 2/2008 |

* cited by examiner

*Primary Examiner*—Kenneth S Kim
(74) *Attorney, Agent, or Firm*—Greenblum & Bernstein P.L.C.

(57) ABSTRACT

A program execution control device which controls execution of a program by a processor having a predicate function for conditional execution of an instruction, wherein the program includes a branch instruction to control iterations in loop processing, the branch instruction is further an instruction to generate an execute-or-not condition indicating whether or not the branch instruction is to be executed at an iteration in the loop processing after a current iteration, and to reflect the execute-or-not condition on a predicate flag used for conditional execution of the branch instruction, the program execution control device comprises a processor status changing unit configured to change, before an execution cycle of the branch instruction, a status of the processor in advance for execution of an instruction following the branch instruction, the status being changed based on the execute-or-not condition reflected on the predicate flag.

15 Claims, 20 Drawing Sheets

FIG. 1A

```
for ( i = N ; i > 0 ; i-- ) {
         sum = sum + a[i] ;
}
```

FIG. 1B

```
L_HEAD: LD      R0, (R10)       // a[i]
        ADD     R1, R0, R1      // sum + a[i]
        SUB     R4, R4, 0x1     // i--
        CMPEQ   R4, 0x0         // (i > 0) ?
        BRZ     L_HEAD ST      (R11), R1       // store sum
```

FIG. 2A

```
for ( i = N ; i > 0 ; i = i-2 ) {
            sum = sum + a[i] ;
            sum = sum + a[i+1] ;
}
```

FIG. 2B

```
for ( i = N ; i > 0 ; i = i-M ) {
            out[i] = a[i] + b[i+M] ;
}
```

FIG. 2C

```
while (sign > 0 ) {
            out[i] = a[i] + b[i] ;
            sign = a[i] * b[i] ;
}
```

FIG. 2D

```
for ( i = N ; i > 0 ; i-- ) {
            res = a[i] * b[i] ;
            if ( res > max_limit ) {
                        index = i ;
                        break ;
            }
}
```

FIG. 4

```
         CMPEQ   C0, R0, R1      // if ( R0 == R1 )
         MOV     R2, R3          //    else r2 = r3
[C0]     MOV     R2, R4          //    then r2 = r4
```

FIG. 5A

```
for ( i = N ; i > 0 ; i = i-2 ) {
         sum = sum + a[i] ;
         sum = sum + a[i+1] ;
}
```

FIG. 5B

```
         SETLB   TR0, L_HEAD
L_HEAD:  LD      R0, (R10)           // a[i]
         ADD     R1, R0, R1          // sum + a[i]
         LD      R0, (R10, 1)        // a[i+1]
         ADD     R1, R0, R1          // sum + a[i+1]
[C0]     BLOOP   C0, TR0, R4, 0x2    //

ST      (R11), R1           // store sum
```

FIG. 6

```
for ( C0 = true ) {
         if ( R4 <= 0 ) {
                  C0 = false;
         }
         R4 = R4 - 0x2;
         goto TR0;
}
```

FIG. 9

| Abbreviated stage name | Stage name | Main operation |
|---|---|---|
| IF (Instruction Fetch) | Instruction fetch stage | Instruction fetch |
| ID (Instruction Dispatch) | Instruction assigning stage | Assign parallel instruction, Pre-decode instruction |
| DC (Instruction DeCode) | Decoding stage | Decode instruction, Read out from register, Detect hazard, Detect forwarding, Compute memory address |
| EM (Execution & Memory) | Computation execution and data memory access stage | Execute computation, Access data memory |
| WB (Write Back) | Write back stage | Write to register, Forward data |

FIG. 10

```
            SETLB    TR0, L_HEAD

L_HEAD:     LD       R0, (R10)              // a[i]
            ADD      R1, R0, R1             // sum + a[i]
            BLOOP    C0, TR0, R4, 0x2       //

[C0]        ST       (R11), R1              // store sum
```

FIG. 14

```
for ( i = 0 ; i < i_max ; i++ ) {
            sum[i] = 0 ;
            for ( j = 0 ; j < j_max ; j++ ) {
                        sum[j] = sum[j] + a[j] ≠ a[i+j] ;
            }
}
```

FIG. 15

```
         SETLB  TR0, L_OUTER
         SETLB  TR1, L_INNER

L_OUTER: MOV    R0, 0x0000
         MOV    R10, R6
         MOV    R11, R7
         ADD    R7, R7, 0x0001

L_INNER: LD     R1, (R10++)
         LD     R2, (R11++)
         MAC    R0, R0, R1, R2
   [C2]  BLOOP  C2, TR1, R4, 0x1

[C2]  ST     (R12++), R0        // sum[i] = sum[i] + a[i] * b[i+j]
   [C3]  BLOOP  C3, TR0, R5, 0x1   // store sum[i]
```

FIG. 16

| Predicate flag ID | Valid/Invalid | Last iteration flag |
| --- | --- | --- |
| C0 | Valid | True |
| C1 | — | False |
| C2 | — | False |
| C3 | Valid | False |

FIG. 17

| Branch target ID | Valid/Invalid | Last iteration flag |
| --- | --- | --- |
| TR0 | Valid | True |
| TR1 | Valid | False |
| TR2 | — | False |

FIG. 23

```
Program
         SETLB    TR0, L_HEAD
         MOV      R14, R15
         ADD      R15, R15, R7
         ..

L_HEAD:  LD       R0, (R10)
         ADD      R1, R0, R1
         LD       R0, (R10, 1)
         ADD      R1, R0, R1
  [C0]   BLOOP    C0, TR0, R4, 0x2

ST       (R11), R1
         MOV      R3, R4
         ..
```

Capacity-reduction instruction format mode

Full-set instruction format mode

Capacity-reduction instruction format mode

BRANCH PREDICTOR FOR SETTING PREDICATE FLAG TO SKIP PREDICATED BRANCH INSTRUCTION EXECUTION IN LAST ITERATION OF LOOP PROCESSING

BACKGROUND OF THE INVENTION (1) Field of the Invention

The present invention relates to a program execution control device which controls programs executed by a single or a plurality of microprocessors.

(2) Description of the Related Art

In recent years, digital appliances such as digital TVs, video cassette recorders, and mobile phones are required to execute digital processing such as speech processing, audio processing, video processing and coding processing, and Graphical User Interface (GUI) operation processing. Other than such a requirement, there are also requests, increasing in number and variety, for the digital appliances to be adaptable to JAVA®, and so on. To fulfill these requests, information processing devices are commonly used, examples of which include microprocessors (including microcomputers, microcontrollers and digital signal processors (DSPs)). To improve the processing performance in response to the increased application requests, the information processing devices are being improved in terms of the operation frequency of processors, and are becoming multithreaded and multi-core, for example. Along with this, the number of pipeline stages, the scale of circuitry, and power consumption of the processors are steadily increasing.

In general, as the number of pipeline stages increases, penalty cycles occur which continue until a new instruction is fetched in executing a branch instruction, and this is one of the reasons causing performance degradation. In order to improve efficiency in executing application programs, such performance degradation needs to be suppressed especially in loop processing in which many processes are performed. In an attempt to suppress performance degradation, a method is known which: predicts that a branch is always taken in a branch instruction used in loop processing (static branch prediction); and stores the beginning instruction of a loop in a loop instruction buffer, thereby suppressing the penalty cycles occurring when a branch from the end of the loop to its beginning is taken (refer to Patent Reference 1: Japanese Patent No. 2987311, for example).

FIG. 1A and FIG. 1B are diagrams each showing an example of a program executed by a processor. FIG. 1A shows a program written in C language, and FIG. 1B shows an assembly program corresponding to the program shown in FIG. 1A.

For example, in the example of the program shown in FIG. 1B, penalty cycles may occur when a branch is taken in executing a branch instruction at the end of a loop (BRZ instruction), (in this case, when branching to an L_HEAD label which is at the beginning of the loop) and also when it is not taken (when the execution proceeds from the BRZ instruction to the following ST instruction).

Further, a method is known which suppresses the penalty cycles caused by a branch not taken in the last iteration of a loop in the loop processing, which cannot be prevented even by the above mentioned static branch prediction or dynamic branch prediction for which a branch history table (BHT) is used. This method predicts with high accuracy the last iteration of a loop in the loop processing using a loop counter, thereby suppressing the branch penalty occurring at the last iteration of the loop where the loop processing is terminated (refer to Patent Reference 2: Japanese Patent No. 3570855, for example).

Meanwhile, to suppress increasing power consumption, a method is known which also focuses attention on the loop processing and reduces power consumption by suspending resources that are not used during loop execution (refer to Patent Reference 3: Japanese Patent No. 1959871, for example).

For example, a processor, having a loop instruction buffer in which instructions to be executed in loops are stored, iterates execution of the stored instructions during the loop execution. Thus, it is unnecessary to fetch instructions from an instruction memory. As a result, it is possible to stop the instruction memory system which includes a cache system, thereby enabling power saving.

Further, a multithreaded processor is becoming effective in suppressing the performance degradation caused by an increase in the number of penalty cycles resulted from an increase in the number of pipeline stages (refer to Patent Reference 4: Japanese Patent No. 3716414, for example).

However, even by means of the static branch prediction which fixes the prediction direction according to the type of the branch instruction (for example, with a loop branch instruction, branch is always predicted to be taken or by means of the dynamic branch prediction which is based on a branch history table and the like and predicts the next judgment based on the frequency with which the past branches were taken, a prediction error cannot be prevented from arising at the branch when the loop processing is to be terminated, and this results in a branch penalty.

Especially the increase in the number of penalty cycles resulted from the recent increase in the number of pipeline stages has increasingly facilitated the performance degradation caused by branch prediction errors.

Furthermore, application programs have a characteristic that a region processed at one time is becoming miniaturized despite an increase in the total amount of processing, as seen in the trend with the video codec standard, for example. For example, processing is performed on 16×16 pixel data in the conventional video codec standard, whereas in the new video codec standard, new processing is introduced which is performed on 4×4 pixel data. This indicates reduction in the number of processing cycles in a single loop.

In addition, the reduction in the number of processing cycles in a single loop is further achieved due to the trend that processors can execute an increasing number of instructions in parallel.

As described, while the improvement in the characteristic of application programs and the increase in the number of instructions that processors can execute in parallel lead to reduction in the number of processing cycles in a single loop, there is a trend that such factors cause an increase in the number of branch penalty cycles.

For example, in the case where there are four loop iterations in loop processing and each of the iterations takes eight cycles for instruction execution, it takes 32 processing cycles for single loop processing. In this case, when the branch penalty takes four cycles, for example, execution performance degradation by over 10 percent occurs every time the loop processing is executed.

To prevent such execution performance degradation in loop processing, the method of predicting the last loop iteration using a loop counter, typified by Patent Reference 2 presented above as an example, has some advantage in being able to predict the last loop iteration with a relatively high frequency. However, this method entails a problem in terms of application targets, software productivity, and resource investment required for hardware implementation.

As for loops to which the last loop iteration prediction by the loop counter method can be applied, the loop counter needs to be incremented and decremented by either 1 or the number of steps fixed in advance. Such restriction is essential for predicting, based on the current loop counter value, that the next iteration is the last loop iteration, that is, in a counter decrementing method, predicting that the counter value in the next loop iteration becomes equal to or smaller than 0.

Consequently, depending on the types of loops, the method of predicting the last loop iteration using a loop counter is not applicable. Control on the prediction of the last loop iteration cannot be applied in the following cases, for example: as shown in FIG. 2A, the loop variable is not incremented and decremented by a value of 1; as shown in FIG. 2B, the loop variable is not incremented and decremented by a predetermined number of steps; as shown in FIG. 2C, the loop is a while loop in which the number of loop iterations is not predetermined; and as shown in FIG. 2D, there may be a jump (a break statement) from an inner loop to an outer loop.

With small-scale software as seen in the field of DSP application in the past, it has been possible to perform algorithm transformation on each loop into a for loop in which the loop variable increments by 1. However, in today's large-scale software application field, such individual algorithm tuning is not realistic from the viewpoint of software productivity. Further, there are cases where algorithm transformation is inherently impossible.

Moreover, although the prediction method using a loop counter enables small-scale circuitry in a single-threaded-program execution environment and when the method is applied only to the deepest for loop, such a prediction method results in an increase in the circuit investment when applied to multiple loops and multi threads.

For example, when triple for loops are to be implemented by the loop counter method, a recording device is needed as hardware which holds and manages a loop counter value of each of the three loops. It may alternatively be just one physical counter register that saves the loop counter value in a stack memory and the like according to the depth of the loop, and returns the loop counter value from the stack memory to the loop counter. However, in such a case, processing cycles are required for the saving and returning processing, and thus the program execution performance degrades.

Such an increase in resources is remarkable especially in multi-threaded processors. This is because stack memories for the loop counters need to be provided as many as the number of threads that the processor can concurrently execute.

Furthermore, other than the hardware configuration in which stack memories are used, there is also a hardware configuration in which a table associated with addresses (program counter values) is used, as shown in Patent Reference 2. However, this configuration also results in large-scale circuitry since the table is needed.

As described above, the control on the prediction of the last loop iteration using a loop counter has been effective in the traditional DSP field in the past, but not in today's high-performance processors with a premise of large-scale software development, from the viewpoint of its application, software productivity, and hardware investment.

SUMMARY OF THE INVENTION

The present invention has been conceived in view to solve the above described problems, and has an object to provide a program execution control device which allows, with a small circuit investment, variously structured loops executed by processors to be the target of the control, and which achieves improved performance and power saving while enhancing the software productivity.

In order to achieve the object set forth above, the program execution control device according to the present invention is a program execution control device which controls execution of a program by a processor having a predicate function for conditional execution of an instruction, wherein the program includes a branch instruction to control iterations in loop processing, the branch instruction is further an instruction to generate an execute-or-not condition indicating whether or not the branch instruction is to be executed at an iteration in the loop processing after a current iteration, and to reflect the execute-or-not condition on a predicate flag used for conditional execution of the branch instruction, the program execution control device comprises a processor status changing unit configured to change, before an execution cycle of the branch instruction, a status of the processor in advance for execution of an instruction following the branch instruction, the status being changed based on the execute-or-not condition reflected on the predicate flag.

With this configuration, the predicate flag enables judgment of whether or not an iteration of a loop in the loop processing is the last loop iteration. As a result, the status of the processor can be changed in advance before the execution of the last loop iteration is terminated. For example, it is possible to accurately change a branch direction, a power control status, and an instruction issuance condition. Consequently, the performance of the system as a whole can be improved through: suppression on the performance degradation caused by branch penalty cycles; power saving brought about by power control; and dynamic control on the number of instructions to be issued.

Furthermore, such control can be performed based on the predicate flag. Therefore, with a small circuit investment, variously structured loops can be the target of the control. As a result, improved performance and power saving can be achieved while enhancing the software productivity.

It is to be noted that the present invention can be embodied not only as the program execution control device which includes the above described characteristic processing units, but also as: a program control method having, as steps, the characteristic processing units included in the program execution control device; and a program causing a computer to execute such characteristic steps included in the program control method. Obviously, such a program can be distributed via recording media such as a Compact Disc-Read Only Memory (CD-ROM) and via communication networks such as the Internet.

As described above, according to the present invention, it is possible to accurately change, for example, a branch direction, a power control status, and an instruction issuance condition as the change of the processor status after loop processing is terminated. As a result, the performance of the system as a whole can be improved through: suppression on the performance degradation caused by branch penalty cycles; power saving brought about by power control; and dynamic control on the number of instructions to be issued.

Particularly, with a small circuit investment, variously structured loops can be the target of the control, and improved performance and power saving can be achieved while enhancing the software productivity.

Further Information about Technical Background to this Application

The disclosure of Japanese Patent Application No. 2007-218827 filed on Aug. 24, 2007 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 1A is a diagram showing an example of a program written in C language;

FIG. 1B is a diagram showing an assembly program corresponding to the program shown in FIG. 1A;

FIGS. 2A to 2D are diagrams each showing an example of a program which includes loop processing;

FIG. 4 is a diagram showing an example of an assembly program in which a predicate flag is used;

FIG. 5A is a diagram showing a program which is written in C language and includes a loop branch instruction;

FIG. 5B is a diagram showing an assembly program corresponding to the program shown in FIG. 5A;

FIG. 6 is a diagram showing an example of a program describing an operation of a loop branch instruction (BLOOP instruction);

FIG. 9 is a table for describing a pipeline structure of an assumed processor;

FIG. 10 is a diagram showing an example of a program for describing operational procedures of a processor;

FIG. 14 is a diagram showing an example of a program for describing a multiple loop;

FIG. 15 is a diagram showing an example of a program for describing a multiple loop;

FIG. 16 is a diagram for describing a last loop iteration judgment in a multiple loop;

FIG. 17 is a diagram for describing a last loop iteration judgment in a multiple loop;

FIG. 23 is a diagram showing an example of an application of the processor according to the third embodiment.

DESCRIPTION OF THE PREFERRED EMBODIMENT(S)

Figure 3:
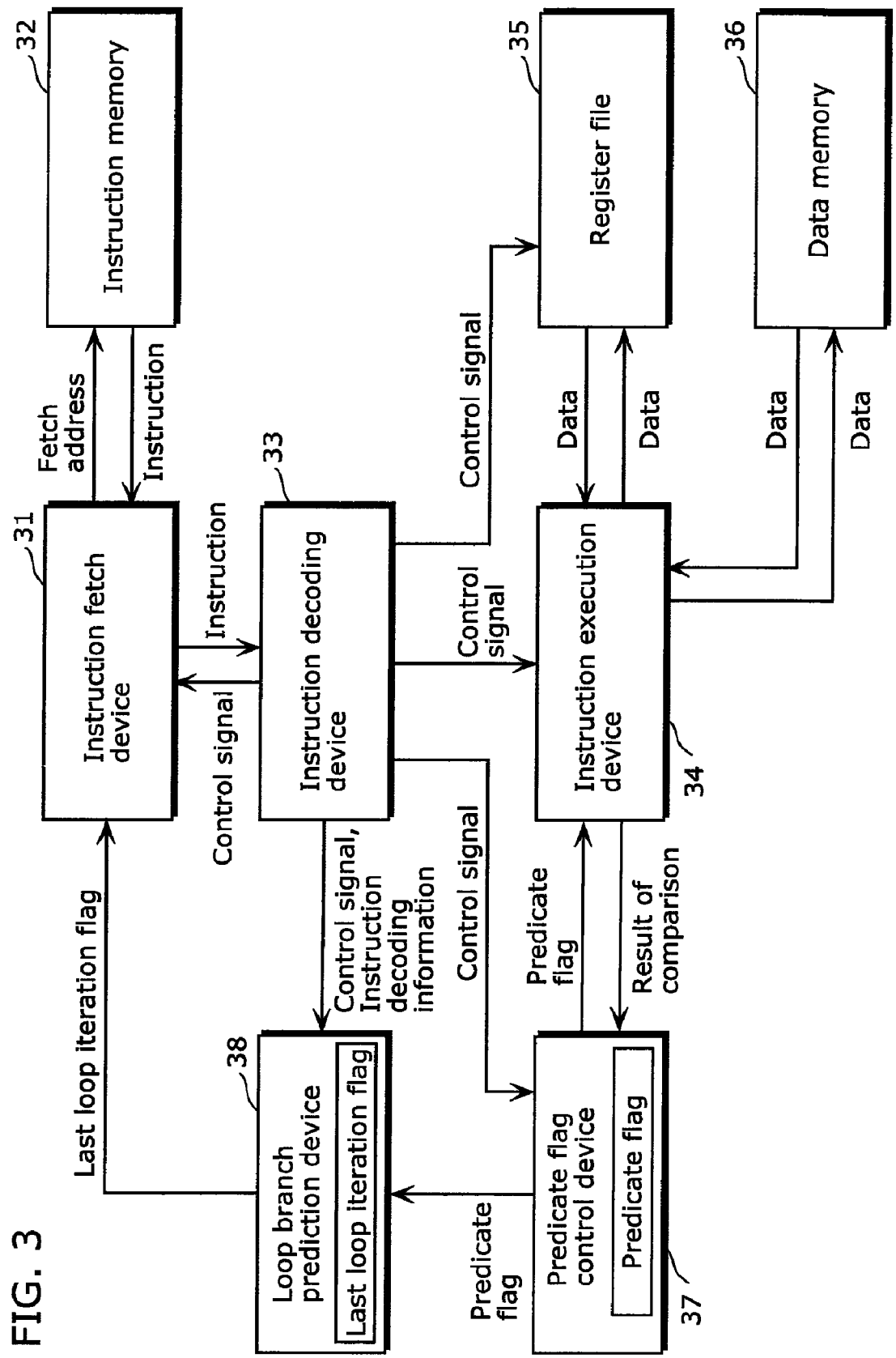
FIG. 3 is a block diagram showing the configuration of a processor according to a first embodiment of the present invention.

Hereinafter, embodiments of the present invention shall be described in detail with reference to the accompanying drawings. It is to be noted that like parts are denoted by like reference numerals throughout the drawings and descriptions thereof are not repeated.

First Embodiment

FIG. 3 is a block diagram showing the configuration of a processor according to a first embodiment of the present invention.

The processor is a device which executes a program, and includes an instruction fetch device 31, an instruction memory 32, an instruction decoding device 33, an instruction execution device 34, a register file 35, a data memory 36, a predicate flag control device 37, and a loop branch prediction device 38.

The instruction memory 32 is a memory in which instructions constituting a program are stored.

The instruction fetch device 31 is a processing unit that fetches instructions stored in the instruction memory 32. The instruction fetch device 31 sends to the instruction memory 32 an instruction fetch address indicating where an instruction is stored in the instruction memory 32. The instruction memory 32 in turn sends to the instruction fetch device 31 an instruction stored at the received instruction fetch address. The instruction fetch device 31 sorts received instructions as necessary, and supplies the sorted instructions to the instruction decoding device 33.

The instruction decoding device 33 is a processing unit that decodes each of the supplied instructions, and according to the details of the instruction, sends a control signal to each block in the processor to direct the operation of the instruction.

The register file 35 includes plural general purpose registers and plural dedicated registers, in which various data is stored.

The data memory 36 is a memory in which various data is stored.

The instruction execution device 34 is a processing unit that includes: a computing unit such as an Arithmetic Logic Unit (ALU) and a Multiplier-Accumulator (MAC); and a dedicated circuit implementing the operation of each instruction. The instruction execution device 34 sends and receives computation data to and from the register file 35, or to and from the data memory 36, based on the directive indicated in the control signal which is in accordance with the instruction received from the instruction decoding device 33. The instruction execution device 34 then performs computation on the computation data, and sends the computation result to either the register file 35 or the data memory 36 depending on the instruction.

The predicate flag control device 37 has predicate flags which are conditional flags for the conditional execution of instructions by the instruction execution device 34. Each predicate flag is 1-bit wide, and indicates whether a condition is true or false. Written into each predicate flag is either true or false, that is, a result of a compare instruction executed by the instruction execution device 34, for example.

FIG. 4 shows an example of an assembly program in which a predicate flag is used. A CMPEQ instruction shown in FIG.

4 is an instruction to judge whether or not a value stored in a register R0 and a value stored in a register R1 are equal to each other, and to write 1 to a specified predicate flag C0 when these values are equal (true), and to write 0 to the predicate flag C0 when these values are not equal (false). In the example shown in FIG. 4, an MOV instruction in the third step is executed only when the predicate flag C0 indicates 1 (true). Using the predicate function in such a manner, conditional execution of an if statement and the like in C language can be expressed. It is to be noted that the predicate function itself shown here is a general predicate function equipped in processors available in recent years having a high instruction parallelism.

The loop branch prediction device 38 in FIG. 3 is a processing unit that generates a last loop iteration flag indicating that the next iteration of the loop is the last iteration, based on instruction decoding information outputted from the instruction decoding device 33 and on the value of the predicate flag outputted from the predicate flag control device 37.

When directed by the instruction decoding device 33 to execute a loop branch instruction, the instruction fetch device 31 refers to the last loop iteration flag supplied by the loop branch prediction device 38, judges that the branch is taken (judges that the next loop is to be executed) when the last loop iteration flag indicates invalidation (0 as a value, for example), and performs branch processing by fetching an instruction stored at a branch destination address, which is an address at which an instruction to branch to is stored. When the supplied last loop iteration flag indicates validation (1 as a value, for example), the instruction fetch device 31 judges that the current loop is the last iteration in the loop processing and thus that the branch is not taken, and performs branch processing accordingly. In other words, instead of fetching and instruction stored at a branch destination address, the instruction fetch device 31 fetches an instruction stored at a subsequent address which is the next value of the program counter, and supplies the fetched instruction.

FIGS. 5A and 5B each show an example of a program which includes a loop branch instruction according to the present embodiment. FIG. 5A shows a program written in C language, and FIG. 5B shows an assembly program corresponding to the program shown in FIG. 5A. In this example, the loop variable is incremented and decremented by −2. Further, a BLOOP instruction is equivalent to a loop branch instruction. That is to say, the BLOOP instruction is equivalent to the loop branch instruction characterized in that an execute-or-not condition for the next execution of the BLOOP instruction is generated at execution of one loop branch instruction prior to the loop branch instruction (here, the BLOOP instruction), and in that the contents of this execute-or-not condition is reflected on the predicate flag. It is to be noted that the initial value of R4 is N−2.

In FIGS. 5A and 5B, a SETLB instruction is an instruction to store: an address indicated in an L_HEAD label; and an instruction corresponding to this address at an address TR0 in the loop instruction buffer. Processors having plural loop instruction buffers identify the address of each loop instruction buffer by designations such as TR0 and TR1.

Here, to describe the operation of the BLOOP instruction, FIG. 6 shows a functional expression in C language. As shown at the line head of the BLOOP instruction, the predicate flag C0 specifies whether or not the BLOOP instruction is to be conditionally executed. In other words, the BLOOP instruction is executed when the predicate flag C0 indicates true, and not executed when false.

Since C0 is specified by the operand of the BLOOP instruction, when the value of R4 is equal to or smaller than 0, C0 is written with a value of false; otherwise with a value of true.

Further, since R4 and 0x2 are specified by the operand, R4 is decremented by 2, and then branching is performed to the address of a loop instruction buffer specified with an identifier TR0.

The characteristic of the BLOOP instruction is that a condition for the next instruction execution is directly generated during the current instruction execution. As a result, the next branch can be accurately predicted even under various loop conditions.

Implementation of loop branch instructions may take various forms depending on methods of generating conditions. Although it is judged whether or not the value of the register R4 is equal to or smaller than 0 in the above described example, it may be judged whether or not the value of the register R4 and a predetermined value match each other, or whether or not the value of the register R4 is zero, or the judgment may be a sign judgment. Further, although, in the above described example, the function to decrement the value of the specified register R4 by an immediate value is executed in parallel with the above mentioned judgment, the details of the computation is not limited to this.

It is to be noted that even with the BLOOP instruction shown in the example, it is possible to control loops the number of which is not predetermined (while loops in C language), by setting 0x0 as a decrement value and placing a compare instruction before the BLOOP instruction, for example.

The generation of the condition for loops using the predicate function makes it possible to easily adapt to multiple loops. For example, as for a double loop, using the predicate flag C0 for the inner loop and the predicate flag C1 for the outer loop enables identification of each loop.

Unlike the case of using flags, such as a carry flag, a sign flag, and a zero flag, which show characteristics of common computation results, use of the predicate flag enables identification of one another (a conditional statement for loop judgment and a conditional statement other than that) even when there is a conditional statement other than a loop judgment in a loop.

Figure 7:
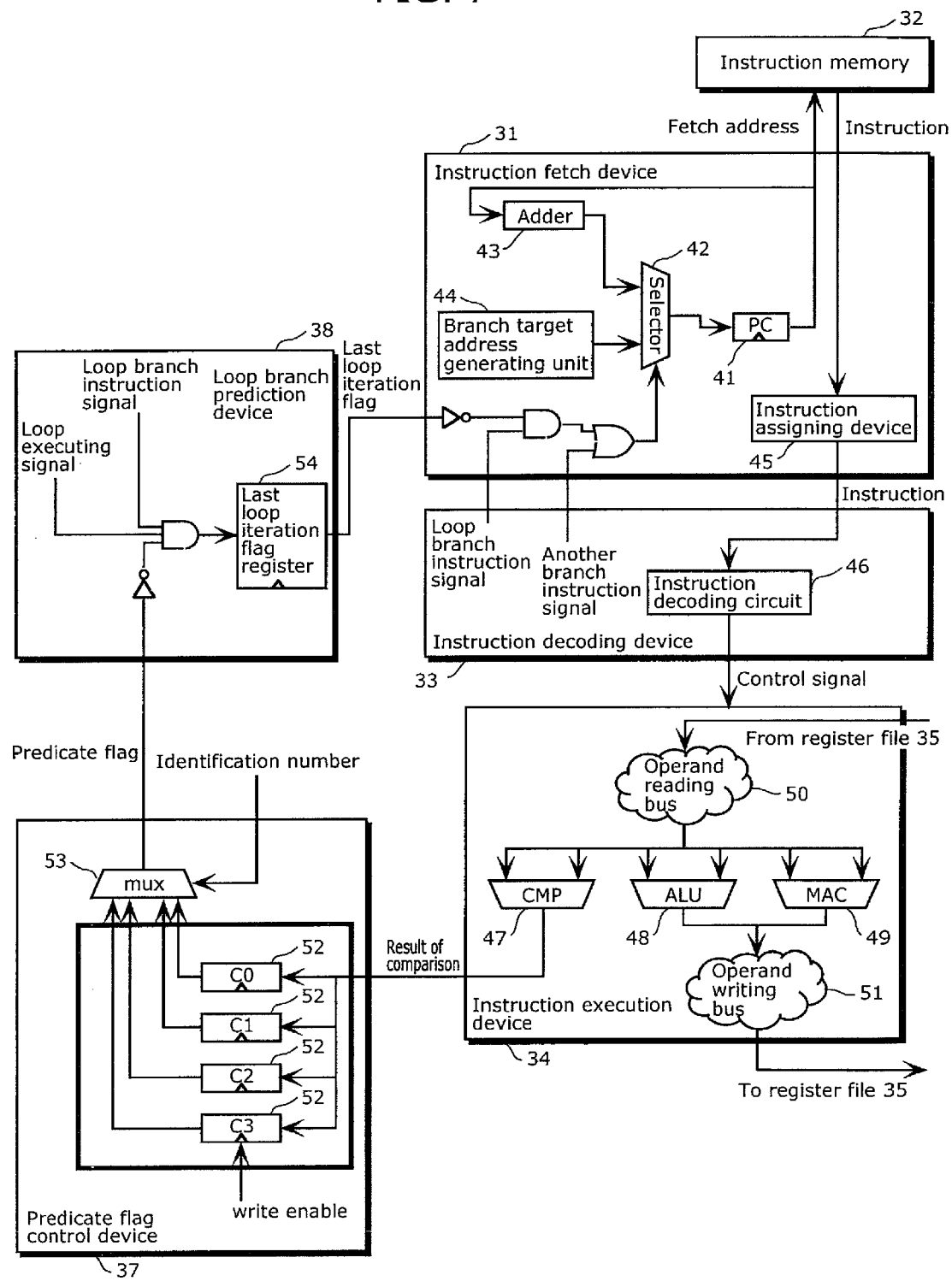
FIG. 7 is a diagram showing an example of a circuit included in the processor according to the first embodiment.

FIG. 7 shows an example of a circuit included in the processor according to the first embodiment.

The instruction fetch device 31 includes a fetch program counter 41, a selector 42, an adder 43, a branch target address generating unit 44, and an instruction assigning device 45.

The instruction decoding device 33 includes an instruction decoding circuit 46.

The predicate flag control device 37 includes plural predicate flag registers 52 and a multiplexer 53.

The loop branch prediction device 38 includes a last loop iteration flag register 54.

The fetch program counter (PC) 41 provided in the instruction fetch device 31 is a register for storing addresses for instruction fetch. Based on a fetch address sent from the fetch program counter 41, the instruction memory 32 outputs to the instruction fetch device 31 an instruction stored at the fetch address.

The instruction assigning device 45 provided in the instruction fetch device 31 extracts an instruction to be executed from the fetched instruction sequence, and supplies the extracted instruction to the instruction decoding device 33.

The instruction decoding circuit 46 provided in the instruction decoding device 33 decodes the supplied instruction, and supplies each device in the processor with a control signal appropriate for each instruction operation.

The instruction execution device 34 in the example of the figure includes a comparator (CMP) 47, an arithmetic and logic unit (ALU) 48, and a multiplier-accumulator (MAC) 49 as computing units. Operand data for computation which has been read from the register file 35 is selected in an operand reading bus 50, and supplied to each computing unit. Then, the results of computation performed by each of the computing units are written to the register file 35 via an operand writing bus 51.

In the case where an instruction to be executed is a compare instruction, the comparator 47 performs a comparison operation, and the result of the comparison operation is outputted to the predicate flag control device 37 in the form of a 1-bit value indicating true/false, and then written to the predicate flag registers 52 associated with the identification numbers C0 to C3 specified by the instruction.

It is to be noted that although the present embodiment shows an example where there are four registers associated with the predicate flags C0 to C3, it is obvious that the number of registers may be any other given number.

Although not shown in the figure since it is an ordinary predicate usage pattern, the instruction decoding device 33 refers to the value of each of the predicate flag registers 52 to determine whether or not an instruction is to be executed, and when the value of each of the predicate flag registers indicates false, the given instruction is invalidated by decoding it as a No Operation (NOP) instruction.

When a loop branch instruction is to be executed, the multiplexer (MUX) 53 selects the contents stored in the predicate flag registers 52 which are associated with the identification numbers (C0 to C3) specified by the operand of the loop branch instruction, and outputs the selected contents to the loop branch prediction device 38.

The contents stored in the last loop iteration flag register 54 are generated based on an inverse value of the contents of the predicate flag selected by the multiplexer 53 and an AND of a signal indicating that the instruction decoded by the instruction decoding device 33 is a loop branch instruction and a signal indicating that a loop is currently being executed. In other words, in the case where the predicate flag indicates false when a loop branch instruction in a loop is executed, the value of the last loop iteration flag register 54 becomes true (1).

The selector 42 selects either a value incremented by the adder 43 or a value generated by the branch target address generating unit 44. The contents stored in the fetch program counter 41 are rewritten to the value selected by the selector 42.

In the case where the instruction to be executed is neither a loop branch instruction nor a branch instruction other than that, the selector 42 selects and outputs the value incremented by the adder 43.

In the case where the instruction to be executed is a branch instruction other than a loop branch instruction, the selector 42 selects and outputs the value generated by the branch target address generating unit 44.

In the case where the instruction to be executed is a loop branch instruction, when the value of the last loop iteration flag outputted by the last loop iteration flag register 54 is false (0), the selector 42 judges that the branch is taken, and selects the value generated by the branch target address generating unit 44. On the other hand, when the value of the last loop iteration flag is true (1), the selector 42 judges that the branch is not taken since the instruction to be executed is located in the last loop iteration, and thus selects the value incremented by the adder 43.

Figure 8:
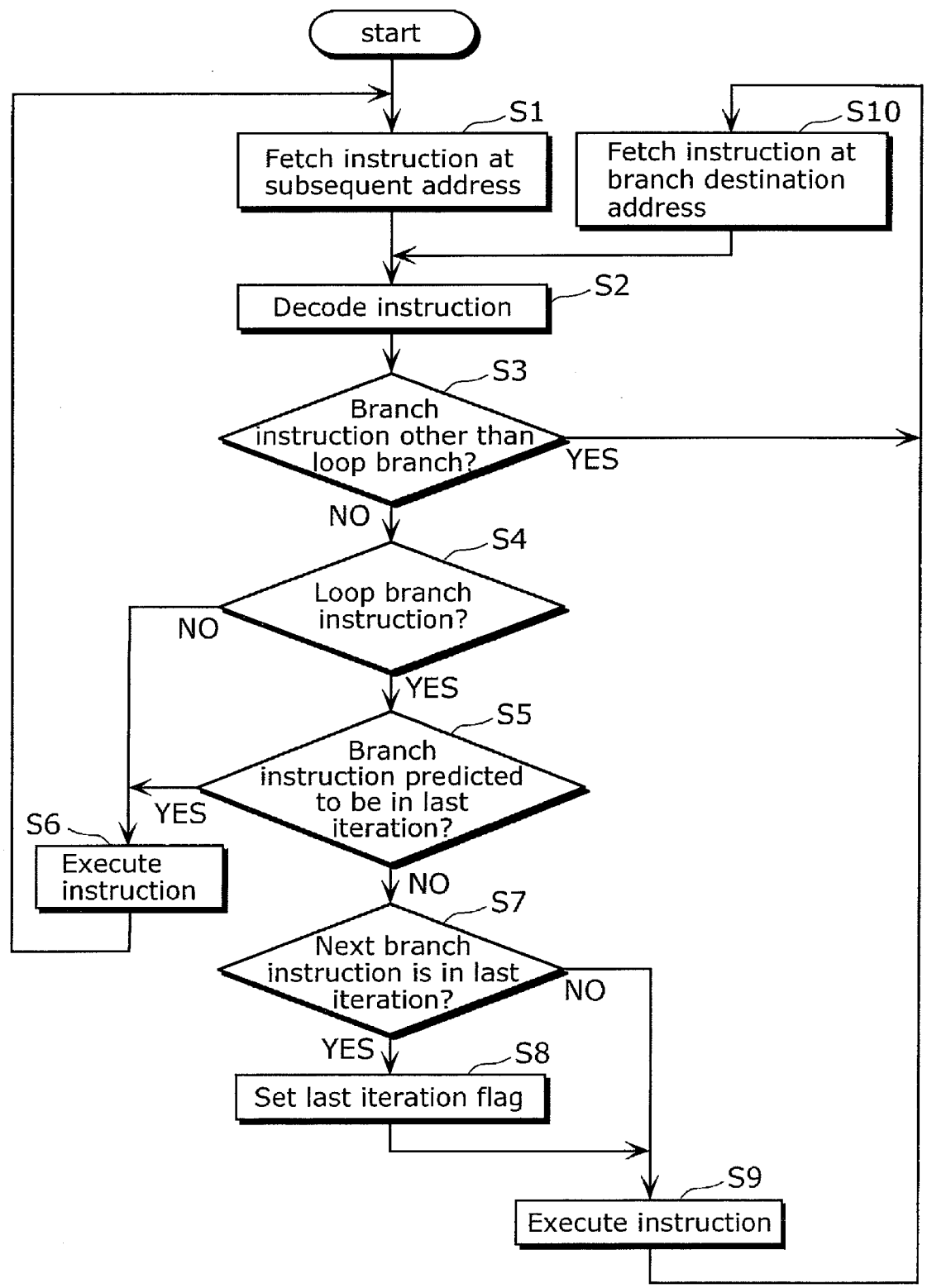
FIG. 8 is a flow chart for describing operational procedures of a processor.

FIG. 8 shows an example of an operation of the processor according to the present embodiment.

The instruction fetch device 31 refers to the fetch program counter 41, and fetches an instruction from the instruction memory 32 (S1). The instruction decoding device 33 decodes the instruction supplied (S2).

Based on the contents of the decoded instruction, the instruction decoding device 33 judges whether or not it is a branch instruction other than a loop branch instruction (S3). In the case where the instruction is a branch instruction other than a loop branch instruction (YES in S3), a branch destination address, stored in the branch target address generating unit 44, is stored in the fetch program counter 41, and the instruction fetch device 31 fetches an instruction stored at the branch destination address (S10). After that, the instruction decoding device 33 decodes the fetched instruction (S2).

In the case where the decoded instruction is not a branch instruction other than a loop branch instruction (NO in S3), the instruction decoding device 33 judges whether or not the decoded instruction is a loop branch instruction (S4). In the case where the decoded instruction is not a loop branch instruction (NO in S4), that is, in the case where the decoded instruction is neither a loop branch instruction nor any other branch instruction, it is executed by the instruction execution device 34 (S6). After that, the processing from S1 onwards is iterated.

In the case where the decoded instruction is a loop branch instruction (YES in S4), the loop branch prediction device 38 judges whether or not the decoded instruction is a branch instruction predicted to be in the last iteration of the loop (S5). This judgment is made based on the value of the last loop iteration flag register 54 shown in FIG. 7. In the case where the decoded instruction is a branch instruction predicted to be in the last iteration (YES in S5), the branch processing for returning to the beginning of the loop is not performed, that is, the loop branch is not taken, and thus the instruction execution device 34 executes the instruction and then the instruction fetch device 31 fetches an instruction stored at a subsequent address so that the subsequent instruction is continuously executed (S1).

In the case of judging that the decoded instruction is not a branch instruction predicted to be in the last iteration (NO in S5), the loop branch prediction device 38 judges whether or not the next branch instruction is in the last iteration (S7). This judgment is made by a logic circuit provided at a stage previous to the last loop iteration flag register 54 shown in FIG. 7.

In the case where the next branch instruction is in the last iteration (YES in S7), the loop branch prediction device 38 sets the last loop iteration flag register 54 to true (S8), and the instruction execution device 34 executes this instruction (S9). After that, an instruction stored at a branch destination address is fetched (S10), and the processing from S2 onwards is iterated.

In the case where it is judged that the next branch instruction is not in the last iteration (NO in S7), the instruction execution device 34 executes this instruction (S9), and after that, the processing from S10 followed by S2 onwards is iterated.

Next, with reference to timing charts, the relationship between instruction execution cycles and instructions to be executed shall be described.

First, to simplify the description, a case shall be described where the pipeline stages of the processor are configured in the manner shown in FIG. 9, and in the program, a single loop takes three cycles (three instructions) as shown in FIG. 10.

Figure 11:
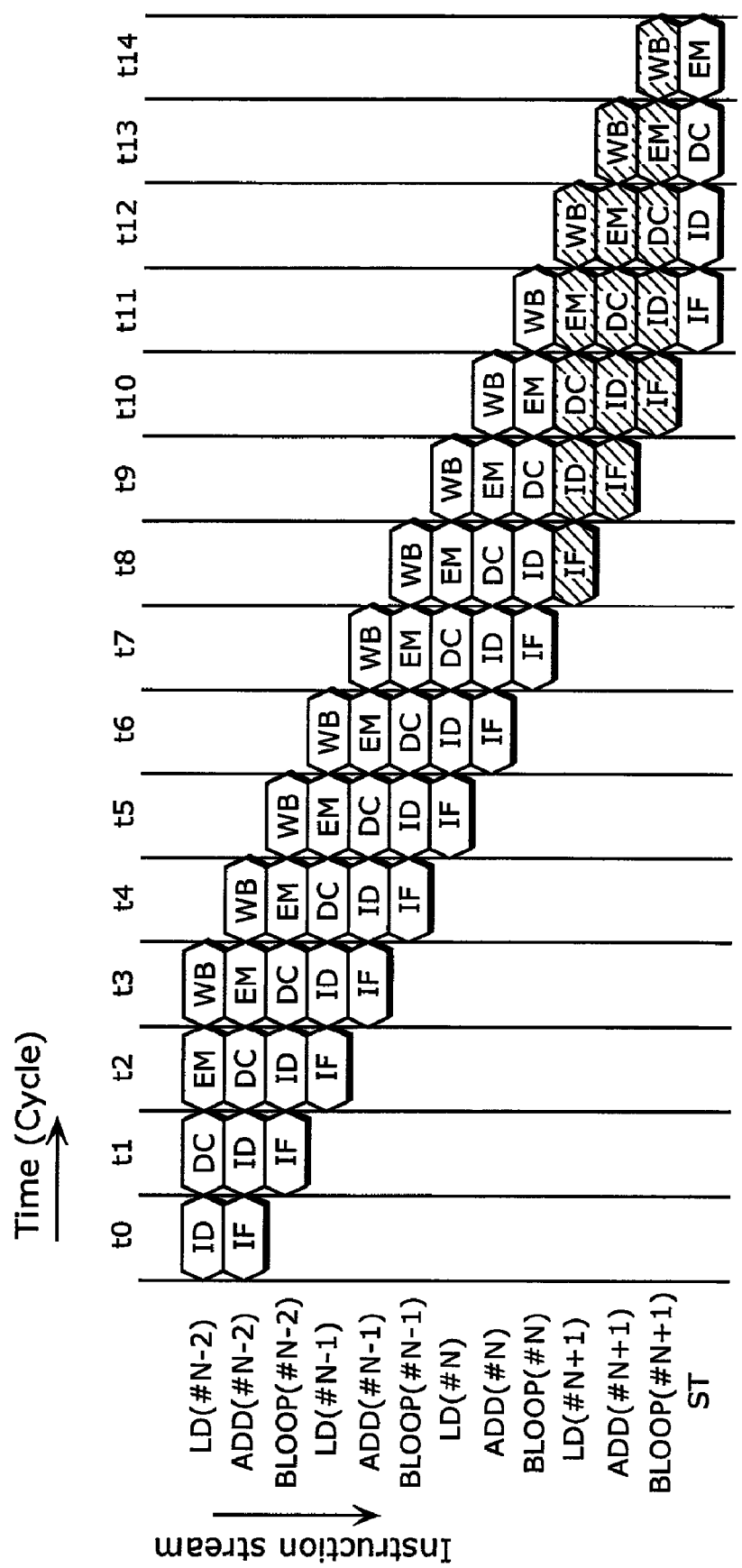
FIG. 11 is a timing chart for describing operational procedures of a processor.

FIG. 11 is a timing chart showing the operation of the processor performed when there is no branch prediction in the last iteration of the loop. In the figure, #i indicates the ith iteration in the loop processing.

In loop iterations other than the last loop iteration, penalty cycles caused by a branch prediction error do not occur between "BLOOP (#N−2)", which is a BLOOP instruction in the second iteration from the last, and "LD (#N−1)". This is because branches in the loop iterations other than the last loop iteration are always predicted as "taken".

However, the branch is predicted to be taken even at "BLOOP (#N)" where the loop is supposed to be terminated, and thus the program branches to the beginning of the loop, and an instruction is fetched and supplied even from "LD (#N+1)" onwards.

With the configuration of the pipeline stages of the processor in this example, the "EM" stage of the predicate-based conditional judgment cycle is at a cycle "t10" at which it is found for the first time that the branch was not to be taken.

Therefore, at the cycle of "t11", a fetch of an "ST" instruction, is that is, a fetch of the instruction which was supposed to be the next instruction, starts. Although the execution of the instructions fetched and supplied between "t8" and "t10" due to the mis-prediction is cancelled through a pipeline flush operation, the performance degrades due to the unnecessary cycles inserted.

Figure 12:
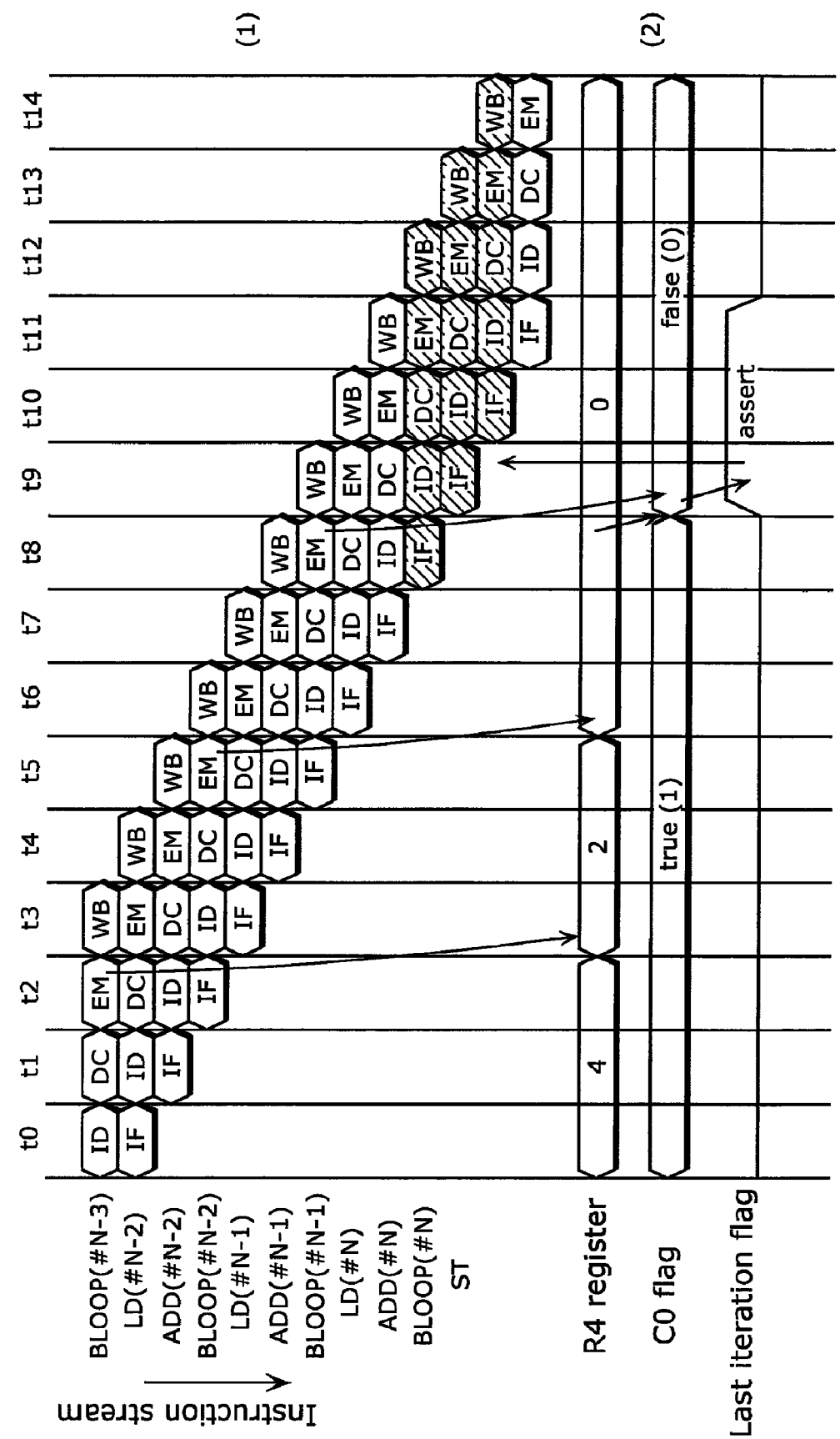
FIG. 12 is a timing chart for describing operational procedures of a processor.

Next, with reference to FIG. 12, an operation for branch prediction according to the present embodiment shall be described.

Based on the instruction of "BLOOP (#N−2)" which is in the second iteration of the loop from the last, the value of the R4 register is decremented by 2 and thus becomes 0.

Then, in the following iteration of the loop, that is, in the first iteration from the last, the value of the R4 register becomes equal to or smaller than 0 based on the instruction of "BLOOP (#N−1)", and therefore the value of the predicate flag C0 is changed to false (0).

Further, the loop branch prediction device 38 generates the last loop iteration flag based on the value of the predicate flag C0. In this example, since the value of the predicate flag C0 has been changed to false, the last loop iteration prediction becomes true.

This is equivalent to a prediction that the next branch instruction is a branch instruction in the last loop iteration.

The instruction fetch device 31 continues to fetch an instruction stored at a subsequent address, and this instruction fetch is validated by the branch prediction. Thus, no miss penalty occurs from the instruction fetch of the branch instruction in the last loop iteration.

In addition, the prediction of the last iteration of the loop is completed at a conditional judgment cycle "t11" of "BLOOP (#N)" in the last iteration. As a result, the prediction of the last iteration can be safely completed. Consequently, proceeding with the processing to a different loop does not cause performance degradation attributable to prediction errors.

Furthermore, it is necessary to maintain consistency of the prediction even when an interrupt or an exception occurs during the execution of the processing in a current loop and the processing makes a transition to an interrupt processing routine. This is because when there is another loop structure in the interrupt processing routine, there is a possibility that the result of a branch prediction in the loop structure before the interrupt processing is performed is misused in executing a loop branch instruction.

To prevent such misuse of the prediction result, the branch prediction may be completed when the processing makes a transition to outside the current loop as a result of a branch to an interrupt or an exception, or as a result of a branch to processing other than loop processing.

Figure 13:
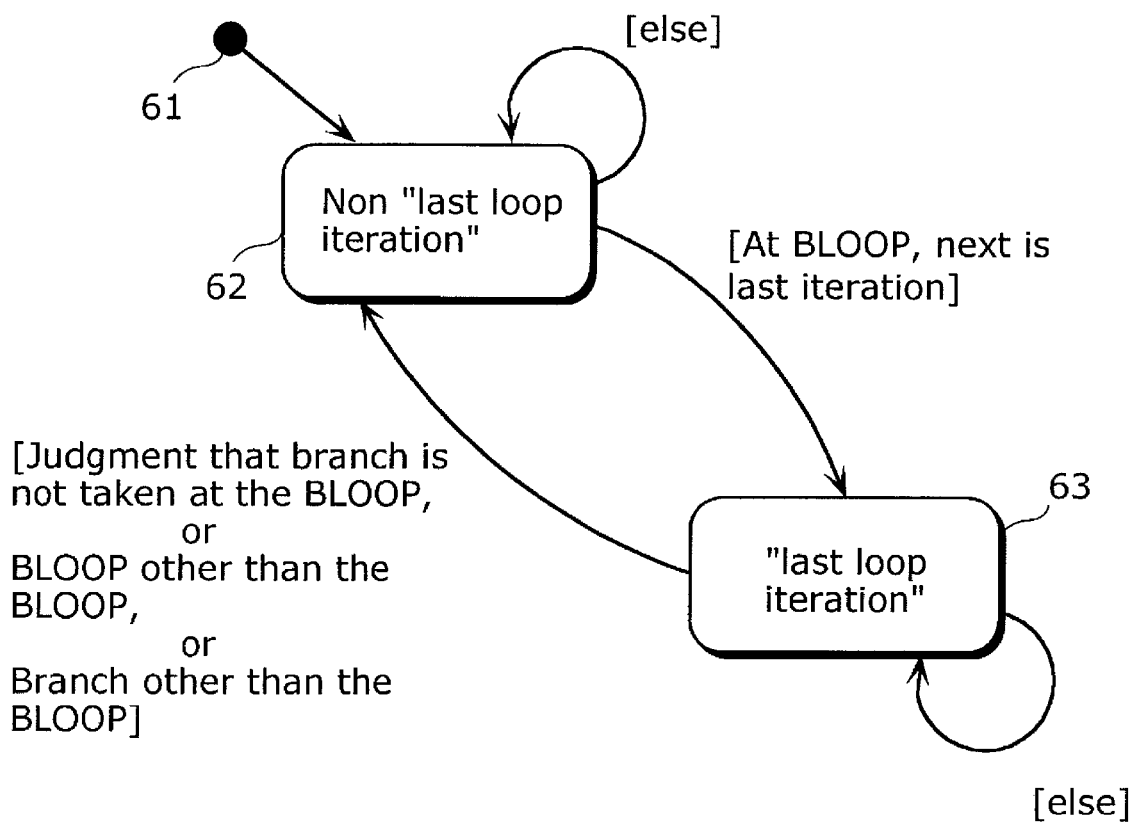
FIG. 13 is a diagram showing status transitions for describing procedures of control performed by a processor.

FIG. 13 shows an example of status transitions in relation to the prediction of the last loop iteration. More specifically, at the beginning of a loop, it is a status 62 indicating that the iteration of the loop is not the last loop iteration. In this status, when execution of a BLOOP instruction leads to the judgment that the next iteration is the last loop iteration, the status changes to a status 63 indicating the last loop iteration. This status returns to the status 62 in any one of the following cases: the current loop iteration is the last iteration and the execution of a BLOOP instruction leads to the judgment that a branch is not taken; a BLOOP instruction in a loop iteration other than the last loop iteration is executed; and a branch instruction other than a BLOOP instruction is executed.

Moreover, when branch prediction errors frequently occur, the processor can be safely operated by providing a mechanism for suppressing the branch prediction function. For example, when branch prediction errors occur more than a predetermined number of times, the branch prediction may be withheld.

Next, a configuration for adapting to multiple loops and conditional branches in loops shall be described.

FIGS. 14 and 15 each show an example of a program which includes a double loop. FIG. 14 shows a program written in C language, and FIG. 15 shows an assembly program corresponding to the program shown in FIG. 14.

For a multiple loop, a simple method of preventing a misjudgment in branch prediction is to perform branch prediction only on the innermost loop.

As an example of the misjudgment, the following shall describe, with reference to in FIG. 15, a case where the last loop iteration flag is set due to a misjudgment, made when a BLOOP instruction in which C3 is used in the outer loop is executed, that the next iteration is the last iteration.

In the case where only loop branch instructions (BLOOPs) are to be detected as branch instructions, when an initial BLOOP instruction for the inner loop is detected after the last loop iteration flag is set as a result of the outer loop, the iteration is misjudged as the last iteration and an operation is performed assuming that the branch is not taken, although the branch actually needs to be taken.

As a method to prevent this, a judgment may be made as to whether or not the predicate flag identifier (C2 or C3 in this example) of the loop, which is the current target for the prediction, matches the predicate flag identifier at the previous detection of the loop branch instruction.

Another method may be to make a judgment as to whether or not branch target register identifier (TR0 or TR1 in this example) matches the branch target register identifier at the previous detection of the loop branch instruction.

In the example of FIG. 15, in the outer loop, C3 is designated as the predicate flag identifier, and TR0 is designated as the branch target register identifier.

One of these pieces of information is held such that when another loop branch instruction is detected, a comparison is made between the held piece of information and the identifier of this branch instruction.

The example set forth above shows the configuration in which, even with a multiple loop, the branch prediction is performed only on the innermost loop, and shows a method suitable for the implementation at a small hardware cost.

In addition, according to the present invention, the branch prediction for predicting the last loop iteration can be accurately performed with a small circuit investment even in a group of loops outside a multiple loop, using the loop branch instruction illustrated in the present embodiment.

As FIG. 16 shows, a table is provided which includes a last loop iteration flag for each predicate flag identifier attached to a loop branch instruction.

This makes it possible, in a multiple loop, to make a distinction between loop branch instructions of respective loops, and further to judge, for each of the loops, whether or not it is a loop in the last iteration.

The circuit resource necessary for hardware used for the table in this method is several bits at the most per predicate. Therefore, compared to the simple counter method in which a table holds a large amount of information on the program counter and so on, it is possible to provide, at a much less cost, a processor which is capable of performing the last loop iteration prediction adaptable to a multiple loop.

FIG. 17 shows an example of a table for making a distinction between loops using, instead of the predicate flag identifiers, the identifiers of branch target registers which hold branch destination addresses.

As described above, according to the present embodiment, at the iteration immediately before the last iteration, the next iteration is predicted as the last iteration, and this prediction result is used as a predicate of the branch instruction. Consequently, no branch instruction is executed in the last loop iteration, and instead, a subsequent instruction is executed. Thus, it is possible to accurately change the branching direction as a change of the processor status after the termination of the loop processing. For this reason, it is possible to suppress the performance degradation in instruction execution caused by branch penalty cycles.

Second Embodiment

A second embodiment is characterized in that a power status is changed as the processing status of a processor.

Figure 18:
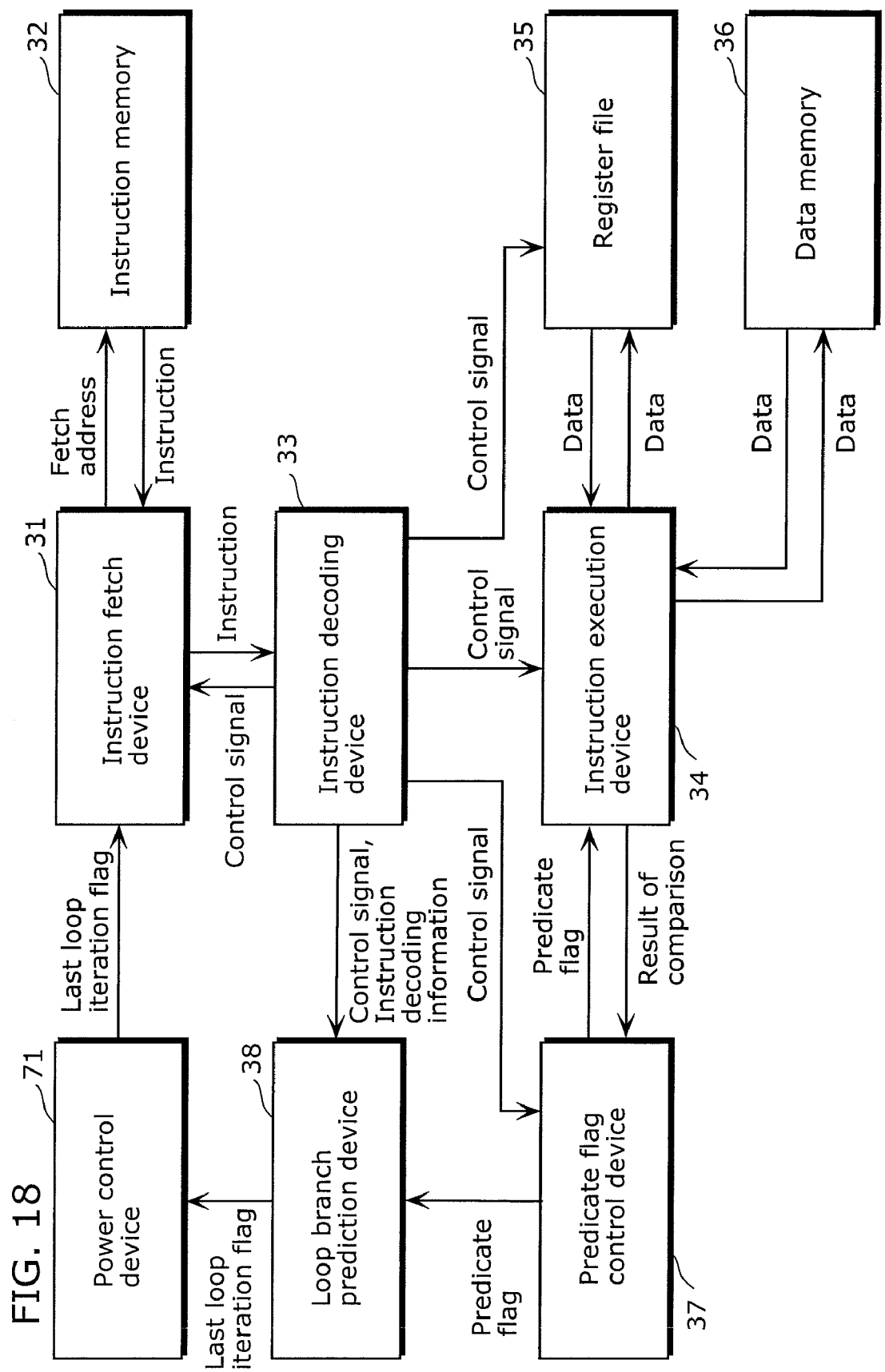
FIG. 18 is a block diagram showing the configuration of a processor according to a second embodiment of the present invention.

FIG. 18 is a block diagram showing the configuration of a processor according to the second embodiment of the present invention.

The processor according to the second embodiment has a power control device 71 in addition to the elements of the processor according to the first embodiment shown in FIG. 3.

Processing performed by the processing units other than the power control device 71 are the same as in the first embodiment. Thus the detailed descriptions thereof are not repeated here.

The power control device 71 performs power control based on the information indicated by the last loop iteration flag.

Figure 19:
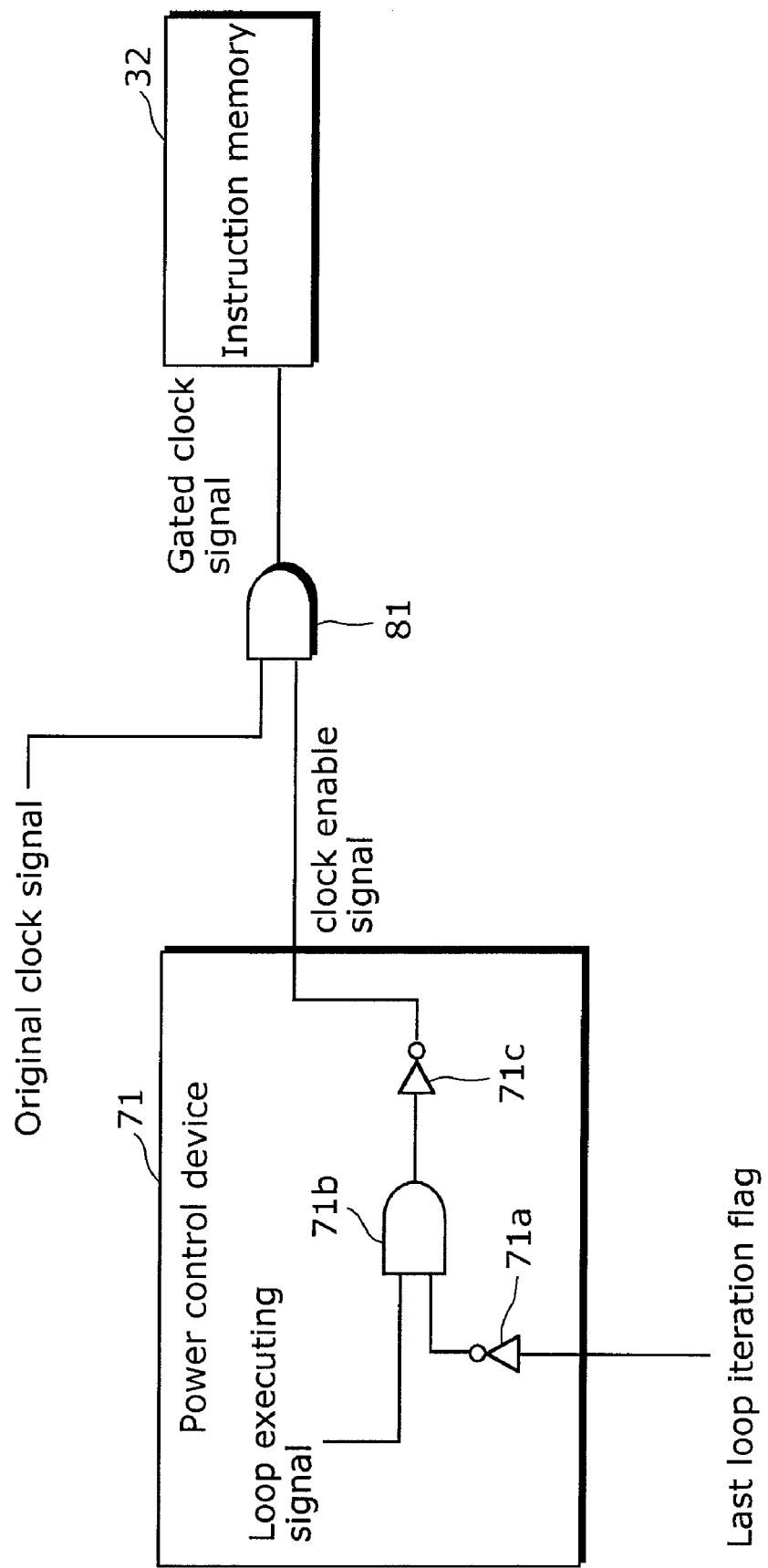
FIG. 19 is a block diagram showing the configuration of a power control device according to the second embodiment.

FIG. 19 shows an example of the configuration of the power control device 71. The power control device 71 includes an inverter 71a, an AND gate 71b, and an inverter 71c.

The inverter 71a inverts the value of the last loop iteration flag. The AND gate 71b computes an AND of the output from the inverter 71a and a loop executing signal indicating that a loop is currently being executed. The inverter 71c inverts the output of the AND gate 71b.

In this configuration example, a clock enable signal becomes 0 when a loop iteration other than the last iteration is executed, and becomes 1 otherwise. The supply of a clock signal to the instruction memory 32 can be suspended while a loop iteration other than the last iteration is executed, by computing an AND of an original clock signal and the clock enable signal and supplying the computation result to the instruction memory 32 as a gated clock signal. Further, the supply of the clock signal to the instruction memory 32 can be resumed when the last loop iteration is reached.

In general, as power control performed on the loop processing for example, control on suspension of an instruction memory system can be considered. For example, the operation of the instruction memory system can be suspended by making it unnecessary to access the instruction memory system by way of storing an instruction to be executed in a loop in a loop instruction buffer such that the instruction can be fetched from this buffer during the loop execution.

An easy way to suspend the instruction memory system is to suppress assertion of an access request signal to the memory. To achieve further efficient power reduction, clock gating can be performed to suspend the clock supply to the memory system.

However, insertion of an AND circuit into a heavy-loaded clock line is likely to cause a bottleneck against improvement of the operation speed of the processor, and thus there is a difficulty in applying the clock gating to high-speed processors.

In view of the above, the configuration shown in FIG. 19 allows sufficient time for resumption of the clock supply to the instruction memory system after the loop processing is terminated, since the clock supply can resume at a cycle earlier than a cycle at which memory access is requested. As a result, even with high-speed processors, power saving can be achieved by suspending the clock signal supplied to the instruction memory system.

Figure 20:
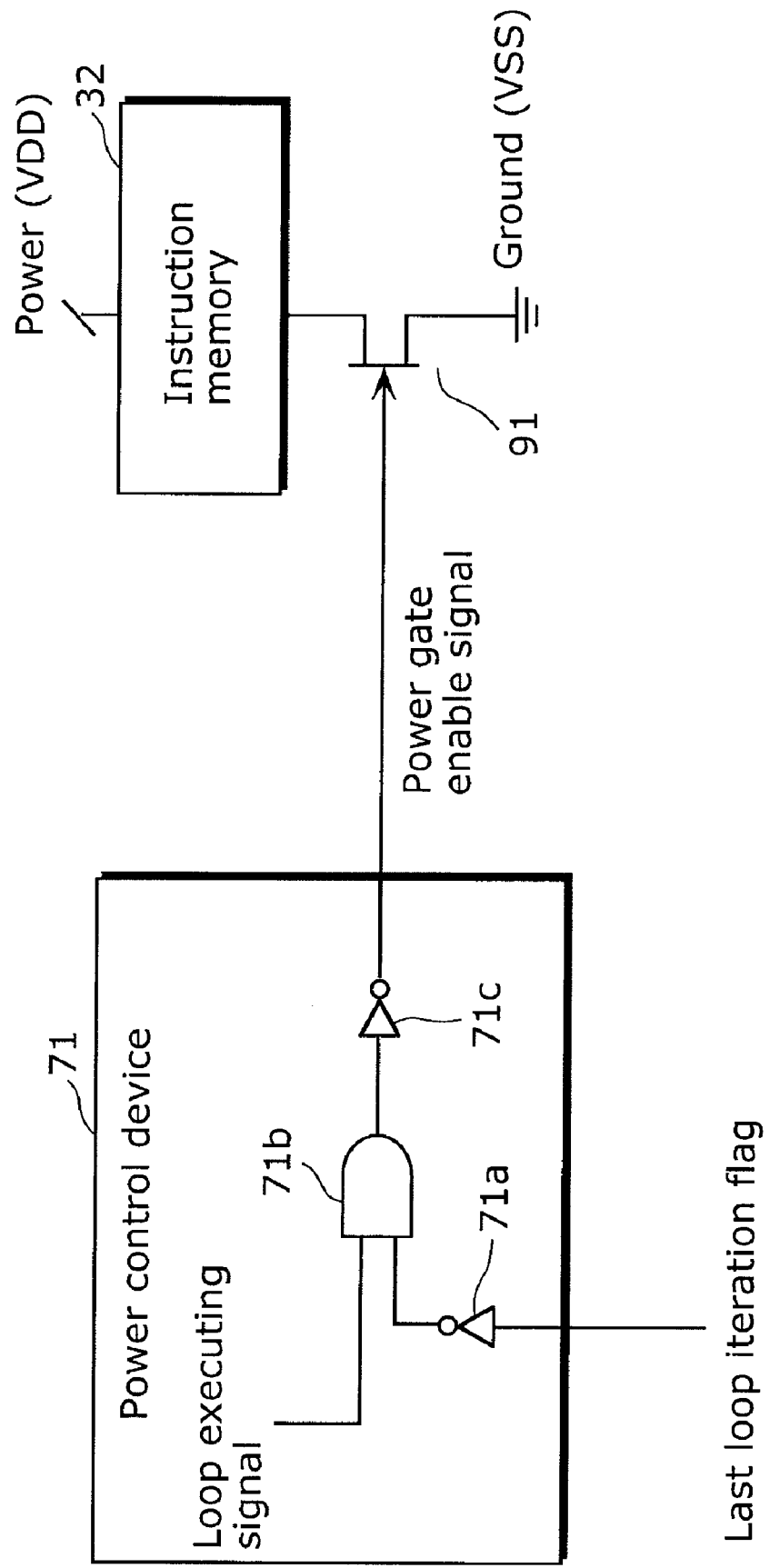
FIG. 20 is a block diagram showing the configuration of a power control device according to the second embodiment.

FIG. 20 shows a configuration in which the power control device 71 shown in FIG. 19 is used for power gating.

To be more specific, the output of the inverter 71c is used as a power gate enable signal, and when the power gate enable signal indicates 1, the power is supplied.

To reduce leak current which keeps on increasing as large scale integration circuits (LSIs) become miniaturized and complex, a power gating method is known for controlling the power using a leak-blockage transistor inserted in series into an ordinary metal oxide semiconductor (MOS) logical circuit.

However, even this method entails a problem that switching to a power gating transistor is time consuming, since it is a heavy-loaded operation. Thus, a switch-on operation is necessary at a timing much earlier than the timing at which a logic operation needs to be performed.

In view of the above, the configuration shown in FIG. 20 enables power gating operation to be performed in advance at a cycle earlier than a cycle at which access is necessary, as in the application of the clock gating as described above, and thus facilitates reduction in leak current of the entire instruction memory system during loop execution, for example.

As described above, according to the present embodiment, it is possible to suspend the clock supply or current supply to the instruction memory 32 during loop processing execution, and to resume, at the last loop iteration, the clock supply or current supply to the instruction memory 32. Thus, it is possible to change the power control status in advance as a change of the processor status after the termination of the loop processing. Consequently, power saving is possible without causing performance degradation attributable to penalty cycles resulting from the power control.

Third Embodiment

A third embodiment is characterized by changing an instruction issuance condition as a change of a processor status.

Figure 21:
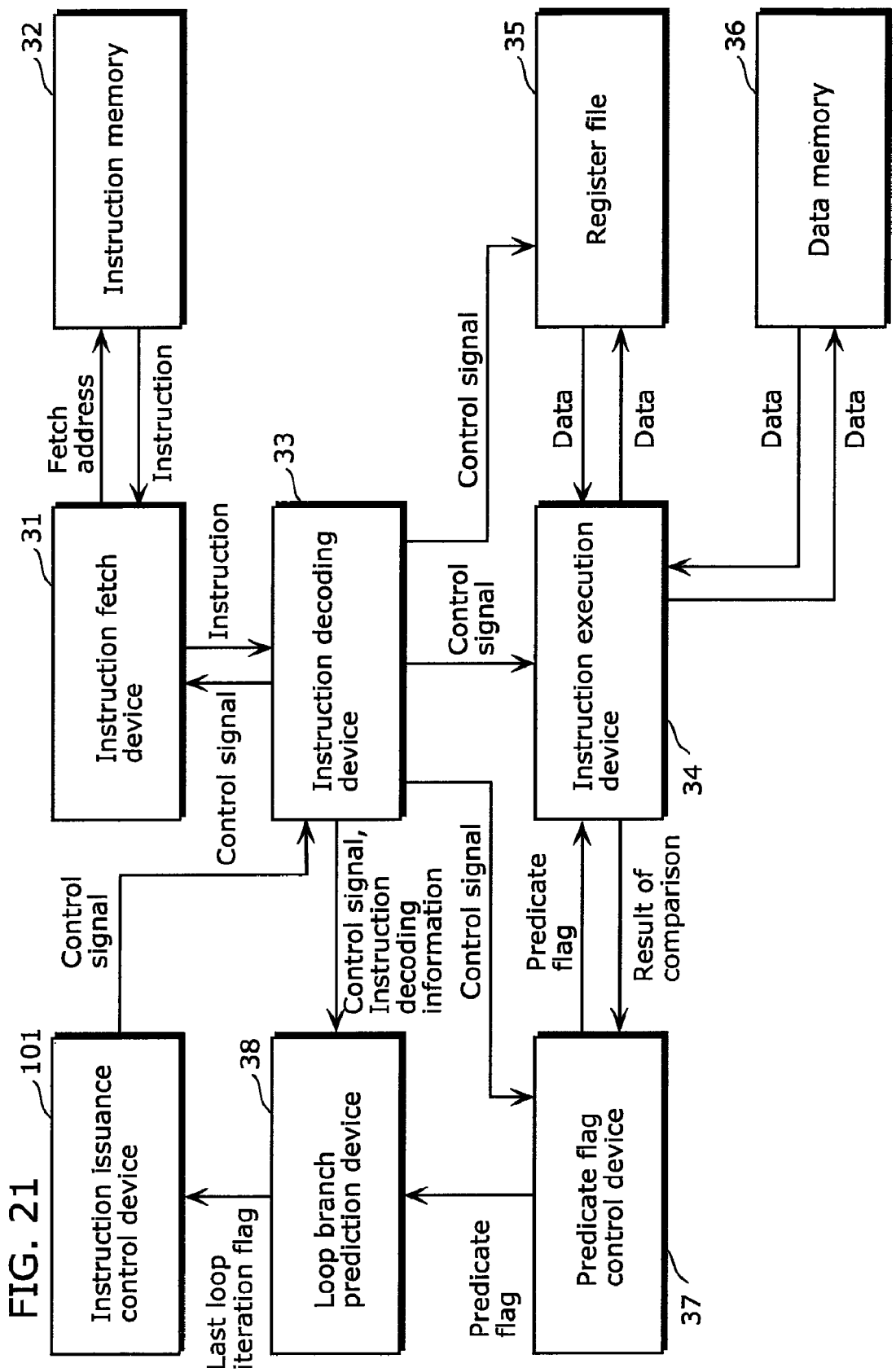
FIG. 21 is a block diagram showing the configuration of a processor according to a third embodiment of the present invention.

FIG. 21 is a block diagram showing the configuration of the processor according to the third embodiment of the present invention.

The processor according to the third embodiment has an instruction issuance control device 101 in addition to the elements of the processor according to the first embodiment shown in FIG. 3.

Processing performed by the processing units other than the instruction decoding device 33 and the instruction issuance control device 101 are the same as in the first embodiment. Thus the detailed descriptions thereof are not repeated here.

The instruction decoding device 33 issues instructions based on a control signal outputted from the instruction issuance control device 101.

The instruction issuance control device 101 controls the instruction issuance performed by the instruction decoding device 33, based on information indicated by the last loop iteration flag.

For example, with a processor having a multithreaded pipeline, the throughput performance of the processor system as a whole can be enhanced through variable control on the number of instructions to be issued for every thread.

Figure 22:
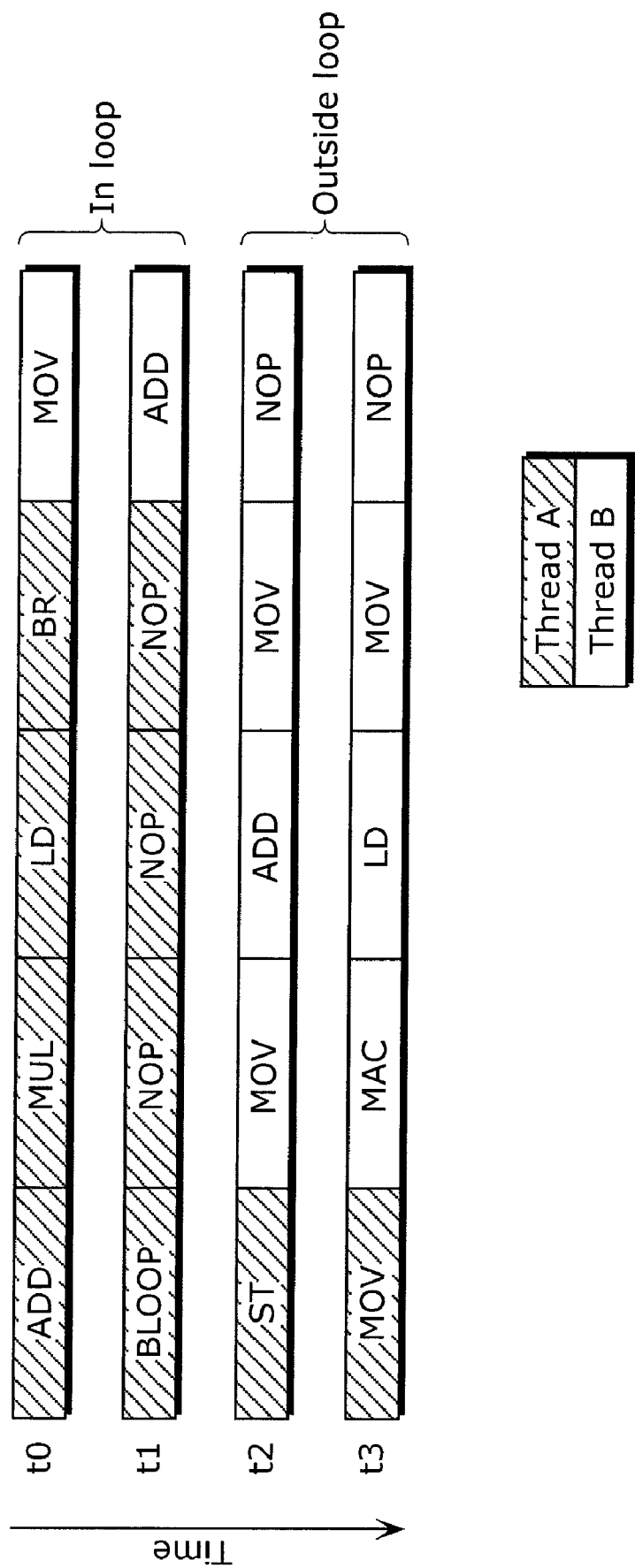
FIG. 22 is a diagram showing an example of an application of the processor according to the third embodiment.

FIG. 22 is a diagram showing, in chronological order, instructions issued by the instruction decoding device 33. The instruction decoding device 33 is assumed capable of issuing five instructions at one time.

For example, the efficiency of the entire processing can be achieved by assigning, during loop execution (time t0 and t1), a thread for loop processing that needs to be executed intensively and promptly (thread A in the figure) with a larger number of instructions to be issued, whereas outside the loop (time t2 and t3), assigning another thread (thread B in the figure) with a larger number of instructions to be issued.

In the present invention, the branch judgment for identifying the last loop iteration is facilitated, and thus it is possible to accurately change the number of instructions to be issued after the loop processing is terminated.

Furthermore, to achieve reduction of program volume, it is possible to configure a processor having plural instruction formats with different instruction bit lengths, including: an instruction format mode having a type of instructions which are wide in bit length but are a full set; and a subset mode which is compact for volume reduction since combinations of instructions are limited.

With such a processor, the maintenance of the processing performance and the reduction of the instruction memory capacity can be both achieved by, as shown in FIG. 23 for example, switching to a capacity-reduction instruction format mode when the processor operates ordinarily, and switching to a full-set instruction format mode when processing capability is needed, that is, when loop processing is executed, for example.

The present invention facilitates the identification of the last iteration of the loop, and thus it is possible to achieve easy and accurate control on both the maintenance of the processing performance and the reduction of the instruction memory capacity.

As described above, according to the present embodiment, it is possible to accurately change the instruction issuance condition as a change of the processor status after the termination of loop processing. As a result, the performance of the system as a whole can be enhanced through dynamic control on the number of instructions to be issued.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention is applicable to information processing devices and the like which include a single microprocessor or multiple microprocessors (including microcomputers, microcontrollers, and digital signal processors).

What is claimed is:

1. A program execution controller which controls execution of a program by a processor, the program including a branch instruction of which a conditional execution is specified by a predicate flag for controlling iterations in loop processing, the program execution controller comprising:
   a loop branch predictor that evaluates, in a current iteration of the loop processing, an execute-or-not condition indicating whether the branch instruction is to be executed in a next iteration of the loop processing;
   a predicate flag controller that sets the predicate flag specifying the conditional execution of the branch instruction based on the evaluation of the execute-or-not condition; and
   a processor status changer that changes a status of the processor, the status of the processor indicating execution of one of the branch instruction and a subsequent instruction following the branch instruction, the status being changed based on the evaluation of the execute-or-not condition in the current iteration and reflected by the predicate flag to indicate execution of the one of the branch instruction and the subsequent instruction in the next iteration.

2. The program execution controller according to claim 1, wherein said processor status changer causes, when the predicate flag indicates that the branch instruction is not to be executed, an instruction fetcher to fetch the subsequent instruction following the branch instruction before an execution cycle of the branch instruction.

3. The program execution controller according to claim 1, wherein said processor status changer suspends one of a power supply and a clock supply to a memory in which the program is stored, when the predicate flag indicates that the branch instruction is to be executed, and resumes the one of the power supply and the clock supply to the memory before an execution cycle of the branch instruction, when the predicate flag indicates that the branch instruction is not to be executed.

4. The program execution controller according to claim 1, wherein said processor status changer changes a restriction condition concerning instruction issuance by the processor, according to the execute-or-not condition specified by the predicate flag.

5. The program execution controller according to claim 1, wherein said processor status changer identifies, based on the predicate flag, a last iteration of the loop processing, and withholds processing for the loop processing controlled by the branch instruction, after the last iteration is executed.

6. The program execution controller according to claim 5, wherein the branch instruction specifies, by an operand, the predicate flag specifying the conditional execution of the branch instruction, and
said processor status changer identifies, based on whether the predicate flag matches a predetermined value, the last iteration in the loop processing.

7. The program execution controller according to claim 5, wherein the branch instruction specifies, by an operand, an identifier of a branch target register which holds an address at which an instruction is stored, the instruction being a branch destination when the branch instruction is executed, and said processor status changer identifies, based on whether the identifier of the branch target register matches a predetermined value, the last iteration in the loop processing.

8. The program execution controller according to claim 5, wherein said processor status changer terminates the identification of the last iteration in the loop processing, when there is a second branch instruction other than the branch instruction corresponding to the predicate flag after identifying, based on the predicate flag, the last iteration.

9. The program execution controller according to claim 5, wherein said processor status changer terminates the identification of the last iteration in the loop processing based on the predicate flag, when at least a predetermined number of errors occur in the identification of the last iteration in the loop processing.

10. The program execution controller according to claim 1, wherein there are two or more branch instructions including the branch instruction, there are two or more predicate flags including the predicate flag, each of the branch instructions specifies, by an operand, a corresponding one of the predicate flags which is used for conditional execution of each of the branch instructions, and said processor status changer changes the status of the processor in advance according to each of the predicate flags.

11. The program execution controller according to claim 1, wherein there are two or more branch instructions including the branch instruction, each of the branch instructions specifies, by an operand, a corresponding one of identifiers of branch target registers, each of the branch target registers holding an address at which an instruction is stored, the instruction being a branch destination when each of the branch instructions is executed, and said processor status changer changes the status of the processor in advance according to each of the identifiers of the branch target registers.

12. A non-transitory computer-readable medium embodying a program for executing a loop process including a plurality of iterations, the program being executed by a computer and causing the computer to execute:

executing a current iteration of the plurality of iterations;

determining, in the current iteration, whether a next iteration of the plurality of iterations is a target iteration of the loop process;

setting, in the current iteration, a value of a predicate flag to one of a first value in response to determining that the next iteration is not the target iteration of the loop process and a second value in response to determining that the next iteration is the target iteration of the loop process;

executing the next iteration of the loop process;

determining, in the next iteration, the value of the predicate flag; and executing, in the next iteration, one of a branch instruction in response to determining that the value of the predicate flag is the first value and a subsequent instruction in response to determining that the value of the predicate flag is the second value.

13. The non-transitory computer-readable medium as set forth in claim 12, wherein the target iteration is the last iteration of the loop process.

14. A method of executing a program with a computer, the program stored in a memory and including a loop process including a plurality of iterations, the method comprising:

executing a current iteration of the plurality of iterations;

determining, in the current iteration, whether a next iteration of the plurality of iterations is a target iteration of the loop process;

setting, in the current iteration, a value of a predicate flag to one of a first value in response to determining that the next iteration is not the target iteration of the loop process and a second value in response to determining that the next iteration is the target iteration of the loop process;

executing the next iteration of the loop process;

determining, in the next iteration, the value of the predicate flag; and executing, from the memory and in the next iteration, one of a branch instruction at a branch destination address in response to determining that the value of the predicate flag is the first value and a subsequent instruction at a subsequent address in response to determining that the value of the predicate flag is the second value.

15. The method as set forth in claim 14, wherein the target iteration is the last iteration of the loop process.

* * * * *